Patented Jan. 13, 1942

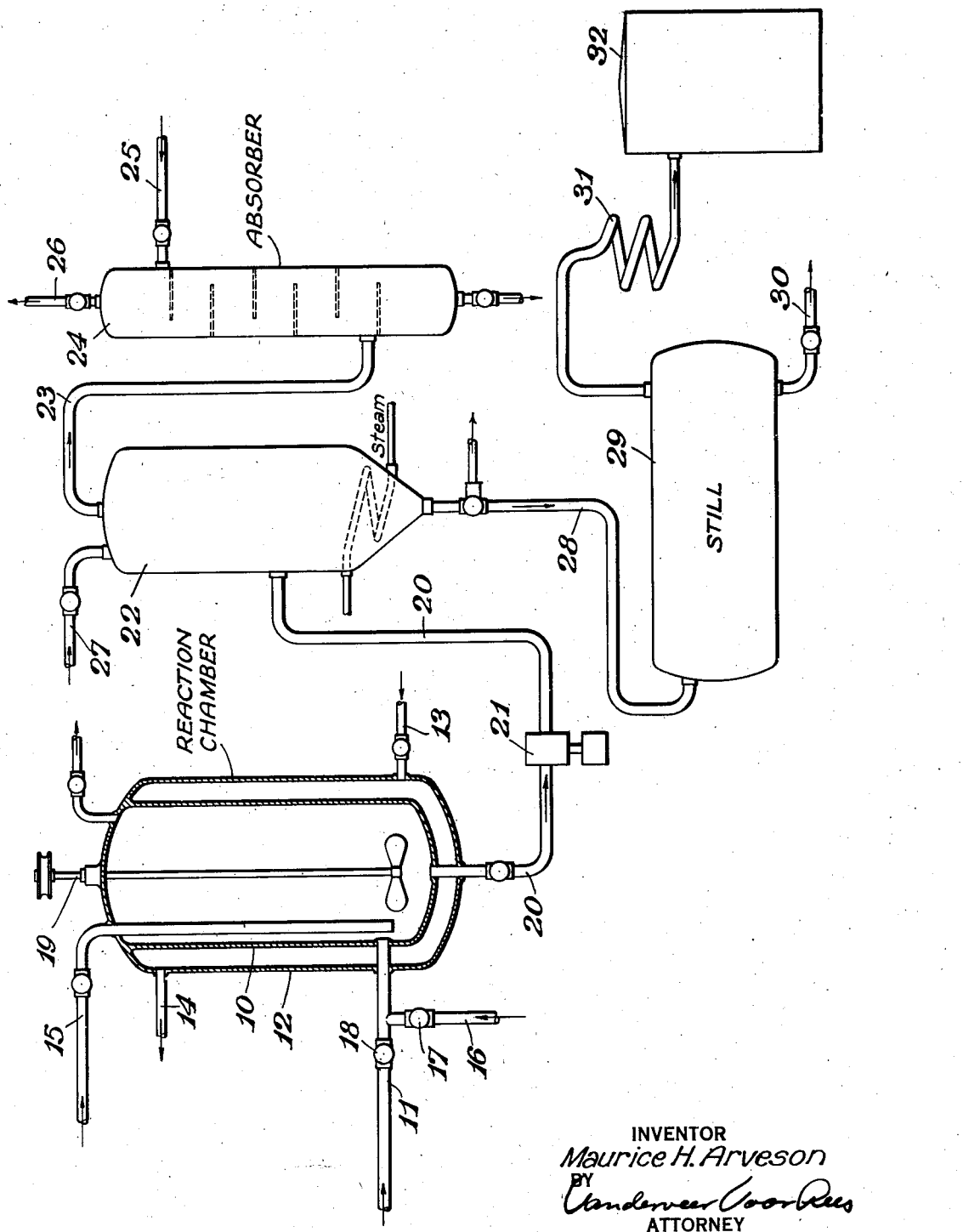

2,269,421

UNITED STATES PATENT OFFICE 2,269,421

MANUFACTURING HYDROCARBON RESINS

Maurice H. Arveson, Chicago, Ill., assignor to Standard Oil Company, Chicago, Ill., a corporation of Indiana Application September 30, 1936, Serial No. 103,286

12 Claims. (Cl. 260—94)

This invention relates to the manufacture of hydrocarbon resins and more particularly to high molecular weight resins derived from the polymerization of olefinic hydrocarbon gases under the influence of catalysts. More specifically, the invention relates to an improvement in the method of polymerizing isobutylene in the liquid phase with boron trifluoride catalyst. The object of the invention is to produce a hydrocarbon resin from isobutylene having a higher molecular weight than similar resins heretofore produced. Another object of the invention is to increase the yield of resin and also reduce the refrigeration requirements. Still another object of the invention is to produce the high molecular weight hydrocarbon resin in a continuous operation. Other objects and advantages of the invention will be apparent from the following description thereof.

In the manufacture of resins by polymerization of liquefied olefin gases, and particularly liquid isobutylene, it has heretofore been the practice to cool the isobutylene to a low temperature, below 0° F. and thereafter introduce the polymerizing catalyst. It has been found that the lower the initial temperature obtained, the higher the yield, viscosity and molecular weight of the resin produced. I have found, however, that in conducting the polymerization reaction in this manner it is substantially impossible to maintain the desired low temperature in the reaction mixture after the reaction begins because of the great rapidity and exothermic nature thereof. For example, I have found that if the liquid isobutylene is cooled to a temperature of —80 to —100° F. and then a stream of boron trifluoride gas is introduced gradually, there ensues a delay period during which time substantially no reaction occurs until the concentration of boron trifluoride has reached a critical amount. The reaction then begins suddenly and proceeds rapidly to substantial completion with a corresponding increase in temperature which is very difficult to control, the temperature being carried to —25 and even to 0° F. or higher. As a result of the poor temperature control the hydrocarbon resin obtained usually possesses a lower molecular weight and lower viscosity than desired, and efforts to overcome this difficulty by cooling the initial reaction mixture to a lower temperature are impractical because of the high cost of such low temperature refrigeration.

In order to overcome the above mentioned difficulties, I have discovered a method for controlling the temperature of the polymerization reaction which may be readily understood by referring to the accompanying drawing which is a sketch, partly diagrammatic, illustrating the apparatus and method for carrying out my improved process.

Referring to the drawing, liquid propane, naphtha, or other inert hydrocarbon diluent is charged into reaction chamber 10 through line 11 where it is cooled below —40 or —50° F., for example to —100° F. by cooling jacket 12 through which a suitable refrigerant, e. g., liquid ethane or $CO_2$-acetone is circulated by pipes 13 and 14. When the propane is sufficiently cooled a current of boron trifluoride gas is introduced through pipe 15 until the propane is substantially saturated with it.

Liquid isobutylene or stock containing isobutylene is now introduced slowly through line 16 controlled by valve 17, valve 18 being closed. The agitator 19 is employed to insure an intimate mixture between the incoming isobutylene and the boron fluoride catalyst and also serves to bring the reaction mixture into contact with the walls of the chamber 10 to increase the rate of cooling by conduction of heat into cooling jacket 12.

Because of the high concentration of boron fluoride in the reaction mixture there is substantially no delay period and the reaction proceeds immediately with evolution of heat, the amount of which is readily controllable by controlling the rate of introducing the isobutylene.

The reaction is continued as long as desired or until the capacity of the reaction vessel is reached. When necessary, additional amounts of boron fluoride catalyst may be introduced from time to time through pipe 15 to maintain the desired catalyst concentration. When the supply of isobutylene is shut off, the agitation is continued for a time until no further reaction occurs. Thereafter the reaction mixture is withdrawn through line 20 and pump 21, to tank 22 in which the resin may be neutralized and washed with water or alcohol. If desired, part of the boron fluoride catalyst may be recovered prior to neutralization by distillation from tank 22, the boron fluoride vapors being conducted by line 23 to absorber 24 where the boron fluoride may be reabsorbed in a fresh quantity of cold liquid propane or other suitable absorbent such as naphtha, benzine, etc. introduced by line 25 and employed in the succeeding batch as previously described. Reduced pressure may be applied to vent 26 to assist in removing the boron trifluoride without undue elevation of temperature in tank 22.

After recovery of catalyst from tank 22, if desired the polymerization product, together with hydrocarbon diluent, which may comprise mostly liquid propane and/or hexane, is treated with an alkaline solution, preferably sodium hydroxide in alcohol, to remove acidic materials, such as hydrofluoric acid and residual boron fluoride. Additional solvent such as hexane, naphtha, lubricating oil, etc. may be added through line 27, and the product is then conducted by line 28 to still 29 where the solvent is removed and the finished resin is recovered free from solvent and withdrawn through outlet 30. The solvent may be condensed in condenser coil 31 and stored in receiver 32 from which it may be recirculated through the system.

It will be readily understood that this process may be operated continuously as well as batchwise, a quantity of reaction liquid being maintained in reaction chamber 10 and isobutylene and boron fluoride being introduced to the reaction chamber continuously. The product may be continuously withdrawn by line 20 and continuously treated in tank 22. One of the advantages of continuous operation lies in the greater efficiency of refrigeration utilization by the use of heat exchangers to cool the materials introduced through lines 11 and 16 taking advantage of the cooling effect of the outgoing product.

A suitable raw material for my process is the butane-butylene fraction from cracking still gases and light cracked gasoline. As one example of the process, 1 volume of liquid propane was approximately saturated at $-100°$ F. with boron fluoride gas at atmospheric pressure. Four volumes of a liquid mixture of isobutylene, normal butylene and butanes containing about 20% of isobutylene was slowly added to the propane-boron fluoride solution with good agitation. Additional boron fluoride gas was bubbled through the reaction mixture to replace that which had reacted and the rate of adding the isobutylene material was controlled so that the temperature did not rise above $-80°$ F. A yield of about 80% of resin was obtained based upon the isobutylene in the raw material, and the molecular weight was higher than that obtained with the same stock where the boron fluoride was added to the isobutylene at the same temperature. The molecular weight obtained was about 8,000. With pure isobutylene instead of a 20% mixture it is possible to obtain much higher molecular weights.

I claim:

1. The process of converting isobutylene to high molecular weight hydrocarbon resins which comprises introducing the isobutylene into a cold liquid reaction mixture comprising a solvent containing boron trifluoride catalyst wherein the concentration of catalyst is sufficient to produce immediate polymerization of the isobutylene and controlling the rate of introduction of isobutylene to prevent the temperature of the reaction mixture rising substantially above $-50°$ F.

2. The process of claim 1 wherein the reaction mixture is maintained at a temperature below $-80°$ F.

3. The process of claim 1 wherein the reaction mixture contains liquid propane as the solvent.

4. The improvement in the process of producing hydrocarbon resins by the polymerization of liquid isobutylene at low temperatures, below $-40°$ F. under the influence of boron fluoride catalyst comprising dissolving the catalyst in an inert solvent and thereafter introducing a regulated amount of isobutylene while agitating and cooling the reaction mixture to absorb the exothermic heat of reaction to prevent appreciable rise in the temperature of the reaction mixture.

5. The process of claim 4 wherein additional amounts of boron fluoride are introduced during the course of the reaction to maintain the desired catalyst concentration in the reaction mixture.

6. The process of continuously converting isobutylene into a high molecular weight viscous hydrocarbon resin comprising continuously introducing isobutylene into a reacting mixture comprising a hydrocarbon solution containing an excess of boron fluoride catalyst, agitating and cooling the said reacting mixture to prevent appreciable temperature rise therein, maintaining the temperature of the reacting mixture between $-50$ and $-100°$ F., adding additional amounts of boron fluoride to the reacting mixture to maintain the desired concentration therein, continuously withdrawing the polymerized product from said reacting mixture and removing unreacted boron trifluoride and fluorine compounds from said reaction product.

7. The process of claim 6 wherein the boron fluoride recovered from the reaction products is returned to said reacting mixture.

8. The process of claim 6 wherein liquid propane is employed as a diluent in the reacting mixture and propane and boron fluoride are simultaneously recovered from the reaction products and returned to the said reacting mixture.

9. In the process of converting isobutylene into high molecular weight hydrocarbon resins wherein liquid isobutylene is polymerized by the action of boron trifluoride at a low temperature, below $-40°$ F., maintained by absorbing the exothermic heat of polymerization as rapidly as it is produced by efficiently refrigerating the isobutylene during polymerization, the improvement comprising controlling the rate of polymerization by introducing a stream of liquid isobutylene into a hydrocarbon solution of boron fluoride and controlling the rate of introducing said isobutylene stream to maintain active polymerization of said isobutylene without permitting the temperature of the reaction to exceed $-40°$ F.

10. The improvement in the process of producing hydrocarbon resins by the polymerization of liquid isobutylene at low temperatures, below $-40°$ F. under the influence of boron fluoride catalyst comprising dissolving the catalyst in an inert solvent, thereafter introducing a regulated amount of isobutylene while agitating and cooling the reaction mixture to absorb the exothermic heat of reaction to prevent appreciable rise in the temperature of the reaction mixture, recovering from the process of said polymerization a solvent which has been treated with alkali to remove traces of boron fluoride catalyst and thereafter re-employing said solvent in said polymerization process.

11. The improvement in the process of producing hydrocarbon resins by the polymerization of liquid isobutylene at low temperatures, below $-40°$ F. under the influence of boron fluoride catalyst comprising dissolving the catalyst in liquid propane and thereafter introducing a regulated amount of isobutylene while agitating and cooling the reaction mixture to absorb the exothermic heat of reaction to prevent appreciable rise in the temperature of the reaction mixture.

12. A continuous method for producing high molecular weight polymers of isobutylene, comprising maintaining a bath consisting of a liquefied normally gaseous inert hydrocarbon with boron fluoride therein, continuously forcing liquid isobutylene into said bath, maintaining the temperature thereof below $-40°$ F., continuously renewing the bath and the catalyst and continuously withdrawing the bath containing the polymer dispersed therein.

MAURICE H. ARVESON.